US009578484B2

(12) United States Patent
Xiong et al.

(10) Patent No.: US 9,578,484 B2
(45) Date of Patent: Feb. 21, 2017

(54) APPARATUSES, SYSTEMS, AND METHODS FOR DIFFERENTIATION OF PAYLOAD SIZE FOR D2D DISCOVERY

(71) Applicant: Intel IP Corporation, Santa Clara, CA (US)

(72) Inventors: Gang Xiong, Beaverton, OR (US); Debdeep Chatterjee, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/570,457

(22) Filed: Dec. 15, 2014

(65) Prior Publication Data

US 2015/0271657 A1 Sep. 24, 2015

Related U.S. Application Data

(60) Provisional application No. 61/969,781, filed on Mar. 24, 2014.

(51) Int. Cl.
 *H04W 8/00* (2009.01)
(52) U.S. Cl.
 CPC ................................ *H04W 8/005* (2013.01)
(58) Field of Classification Search
 CPC ........ H04W 72/04; H04W 8/00; H04W 8/005; H04W 76/023; H04W 72/0446; H04W 72/0406; H04W 40/246; H04L 67/16
 USPC ........................................................ 370/329
 See application file for complete search history.

(56) References Cited

U.S. PATENT DOCUMENTS

| 6,611,536 B1* | 8/2003 | Ahmed | H04J 3/175 |
| | | | 370/336 |
| 2007/0091810 A1* | 4/2007 | Kim | H04L 1/1635 |
| | | | 370/236 |
| 2009/0201838 A1* | 8/2009 | Zhang | H04B 7/2656 |
| | | | 370/280 |

(Continued)

FOREIGN PATENT DOCUMENTS

| WO | WO-2011143496 A1 | 11/2011 |
| WO | WO-2013155198 A1 | 10/2013 |
| WO | WO-2015148158 A1 | 10/2015 |

OTHER PUBLICATIONS

"International Application Serial No. PCT/US2015/020437, International Search Report mailed Jun. 18, 2015", 8 pgs.

(Continued)

*Primary Examiner* — Edan Orgad
*Assistant Examiner* — Vanneilian Lalchinthang
(74) *Attorney, Agent, or Firm* — Schwegman Lundberg & Woessner, P.A.

(57) ABSTRACT

Wireless mobile devices or user equipments (UEs) may communicate directly with other UEs, e.g., using device-to-device ("D2D") direct discovery and communication. D2D direct discovery and communication may be used, for example, when UEs communicate with each other while within direct wireless range of each other. Different service types for D2D direct discovery and communication sessions, such as public safety (PS) services, non-PS services, etc., may utilize different data characteristics for the discovery message (e.g., data types and data structures). Data associated with the at least one data frame of a D2D direct discovery transmission can be configured to indicate these different data characteristics.

15 Claims, 9 Drawing Sheets

(56) References Cited

U.S. PATENT DOCUMENTS

| | | | | |
|---|---|---|---|---|
| 2013/0059583 | A1* | 3/2013 | Van Phan | H04W 72/04 455/435.1 |
| 2013/0157656 | A1* | 6/2013 | Gao | H04W 76/023 455/434 |
| 2013/0272262 | A1* | 10/2013 | Li | H04W 28/02 370/330 |
| 2014/0023008 | A1* | 1/2014 | Ahn | H04W 76/023 370/329 |
| 2014/0056220 | A1 | 2/2014 | Poitau et al. | |
| 2014/0057667 | A1* | 2/2014 | Blankenship | H04L 67/303 455/500 |
| 2014/0256334 | A1* | 9/2014 | Kazmi | H04W 28/18 455/450 |
| 2015/0250011 | A1* | 9/2015 | Lindoff | H04W 76/023 370/225 |
| 2015/0327311 | A1* | 11/2015 | Wei | H04W 4/06 370/329 |

OTHER PUBLICATIONS

"International Application Serial No. PCT/US2015/020437, Written Opinion mailed Jun. 18, 2015", 7 pgs.

Etri, "Resource allocation for D2D discovery", R1-134336, 3GPP TSG RAN WG1 Meeting #74bis, Guangzhou, China, [Online] retrieved from the internet: <(http://www.3gpp.org/ftp/tsg_ran/WG1_RL1/TSGR1_74b/Docs/)>, (Sep. 23, 2013).

Zte, "Discussion of D2D Discovery", R1-133149, 3GPP TSG-RAN WG1 #74, Barcelona, Spain, [Online] retrieved from the internet: <http://www.3gpp.org/ftp/tsg_ran/WG1_RL1/TSGR1_74/Docs/>, (Aug. 10, 2013).

* cited by examiner

APPARATUSES, SYSTEMS, AND METHODS FOR DIFFERENTIATION OF PAYLOAD SIZE FOR D2D DISCOVERY

PRIORITY CLAIM

This application claims the benefit of U.S. Provisional Application No. 61/969,781, filed Mar. 24, 2014, the entire contents of which are hereby incorporated by reference herein.

TECHNICAL FIELD

Embodiments pertain to wireless communications. Some embodiments relate to device-to-device (D2D) discovery services including D2D discovery and discovery services in cellular networks, such as 3GPP LTE networks.

BACKGROUND

Wireless mobile devices or user equipments (UEs) may communicate with each other using radio access technologies such as the 3GPP Long Term Evolution ("LTE") Advanced Release 12 (March 2014) (the "LTE-A Standard"), the IEEE 802.16 standard, IEEE Std. 802.16-2009, published May 29, 2009 ("WiMAX"), as well as any other wireless protocols that are designated as 3G, 4G, 5G, and beyond. Some UEs also may be configured to communicate directly with other UEs, e.g., using device-to-device ("D2D") communication. D2D communication may be used, for example, when UEs initiate communication with each other while within direct wireless range of each other. Different service types for D2D communication sessions, such as public safety (PS) services, non-PS services, etc., may utilize different data characteristics (e.g., data types and data structures).

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that can receive and/or transmit information wirelessly. In some embodiments, the mobile device or other device can be a user equipment (UE) or an Evolved Node-B (eNodeB) configured to operate in accordance with 3GPP standards. In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be an LCD screen including a touch screen.

Figure 1:
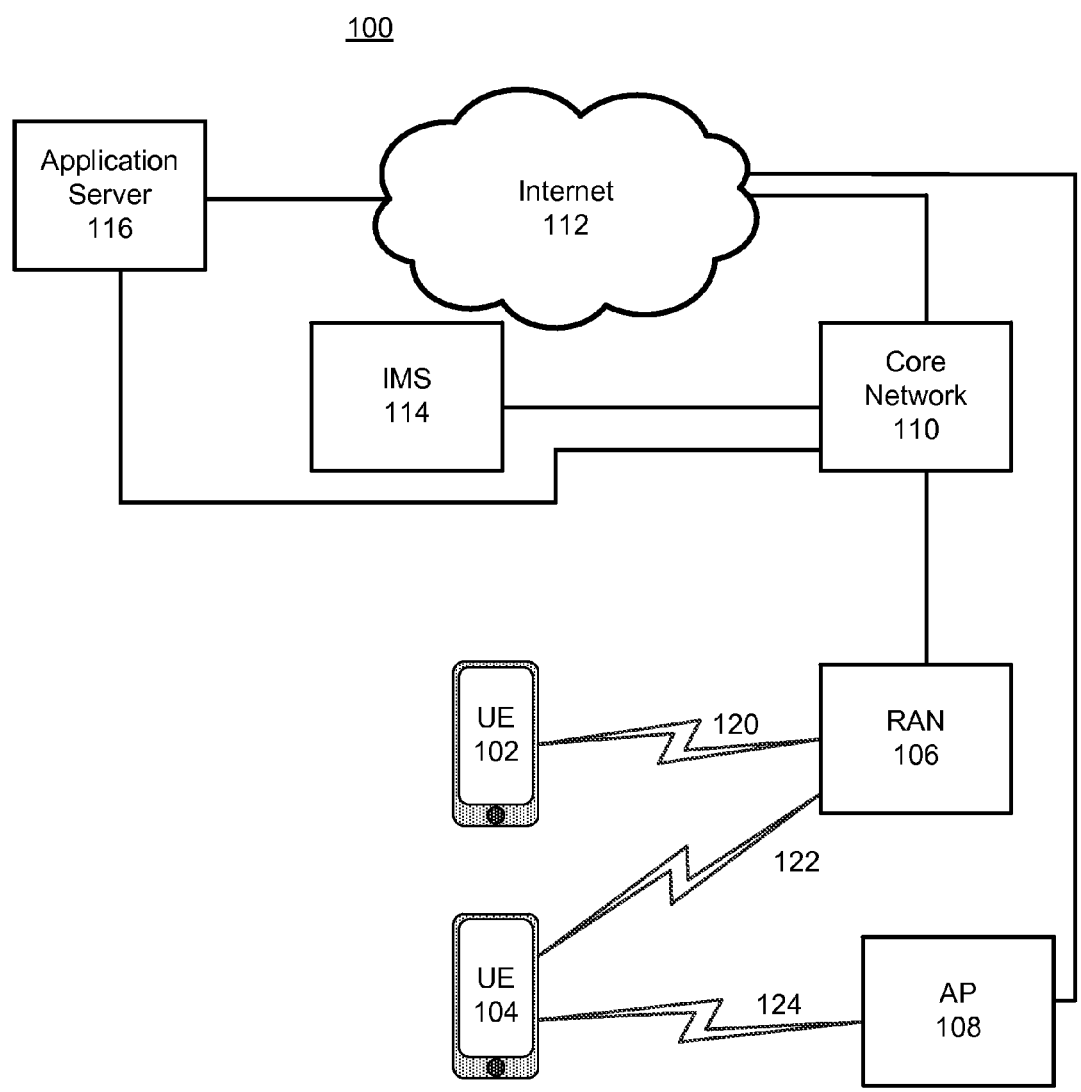
FIG. 1 illustrates an architecture of a wireless network with various components of the network in accordance with some embodiments.

FIG. 1 illustrates an architecture of a wireless network with various components of the network in accordance with some embodiments. A system 100 is shown to include a user equipment (UE) 102 and a UE 104. The UEs 102 and 104 are illustrated as smartphones (i.e., handheld touchscreen mobile computing devices connectable to one or more cellular networks), but can also include personal digital assistant (PDAs), pagers, laptop computers, desktop computers, etc.

The UEs 102 and 104 are configured to access a radio access network (RAN) 106 via connections 120 and 122, respectively, each of which comprise a physical communications interface or layer; in this embodiment, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, etc.

The RAN 106 can include one or more access points that enable the connections 120 and 122. These access points (described in further detail below) can be referred to as access nodes, base stations (BSs), NodeBs, enhanced NodeBs (eNodeBs), etc., and can comprise ground stations (i.e., terrestrial access points) or satellite access points. The RAN 106 is shown to be communicatively coupled to a core network 110. The core network 110 can be used to enable a packet-switched data exchange with the internet 112 in addition to bridging circuit switched calls between the UEs 102 and 104. In some embodiments, the RAN 106 can comprise an Evolved Universal Mobile Telecommunications System (UMTS) Terrestrial RAN (E-UTRAN), and the core network 110 can comprise an Evolved Packet Core (EPC) network.

The UE 104 is shown to be configured to access an access point (AP) 108 via connection 124. The connection 124 can comprise a local wireless connection, such as a connection consistent with IEEE 802.11, wherein the AP 108 would comprise a wireless fidelity (WiFi) router. In this example, the AP 108 is shown to be connected to the internet 112 without connecting to the core network 110.

The internet 112 is shown to be communicatively coupled to an application server 116. The application server 116 can be implemented as a plurality of structurally separate servers, or can be included in a single server. The application server 116 is shown as connected to both the internet 112 and the core network 110; in other embodiments, the core network 110 connects to the application server 116 via the internet 112. The application server 116 can also be configured to support one or more communication services (e.g., Voice-over-Internet Protocol (VoIP) sessions, Push-to-Talk (PTT) sessions, group communication sessions, social networking services, etc.) for UEs that can connect to the application server 116 via the core network 110 and/or the internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, e-mail, internet access, Voice over IP (VoIP), instant messaging (IM), videoconference sessions and video on demand (VoD), etc.

Figure 2:
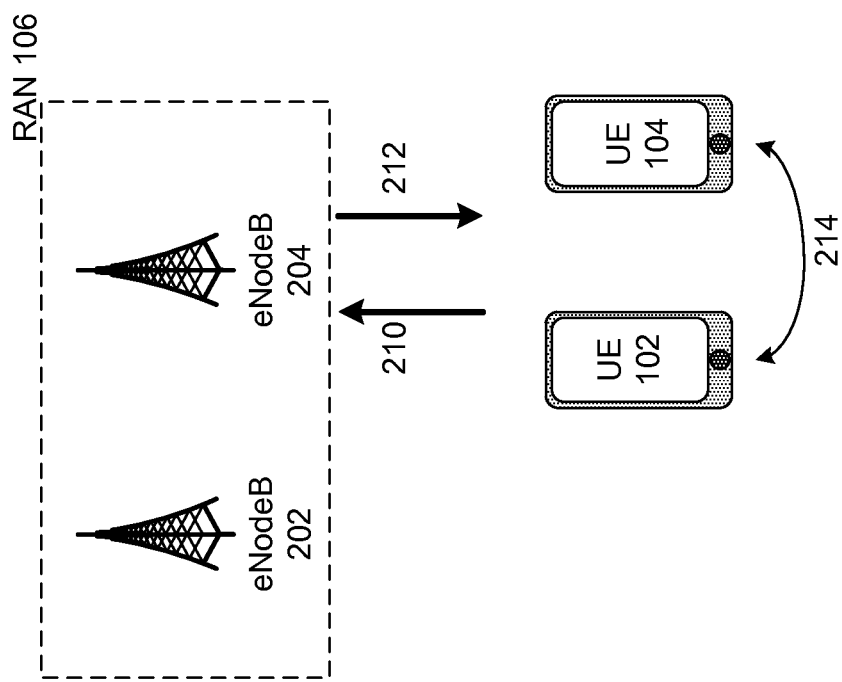
FIG. 2 illustrates an architecture of components of a Long Term Evolution (LTE) network in accordance with some embodiments.

FIG. 2 illustrates an architecture of components of an LTE network in accordance with some embodiments. In this embodiment, the RAN 106 comprises an E-UTRAN and is shown to include eNodeBs 202 and 204 (which can operate as base stations) for communicating with the UEs 102 and 104. The eNodeBs 202 and 204 can be any of macro eNodeBs, low power (LP) eNodeBs, etc.

With cellular networks, low power cells can be used to extend coverage to indoor areas where outdoor signals do not reach well, or to add network capacity in areas with very dense phone usage, such as train stations. As used herein, the term "low power (LP) eNodeB" refers to any suitable relatively low power eNodeB for implementing a narrower cell (i.e., narrower than a macro cell) such as a femtocell, a picocell, or a micro cell. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNodeB might be a femtocell eNodeB since it is coupled through a Packet Data Network (PDN) Gateway (PGW). Similarly, a picocell is a wireless communication system typically covering a small area, such as in-building (offices, shopping malls, train stations, etc.), or more recently in-aircraft. A picocell eNodeB can generally connect through the X2 link to another eNodeB such as a macro eNodeB through its base station controller (BSC) functionality. Thus, an LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, this can be referred to as an access point base station or enterprise femtocell.

The eNodeBs 202 and 204 can terminate the air interface protocol and can be the first point of contact for the UEs 102 and 104. In some embodiments, any of the eNodeBs 202 and 204 can fulfill various logical functions for the RAN 106 including but not limited to radio network controller (RNC) functions such as radio bearer management, dynamic radio resource management and data packet scheduling for uplink communications 210 and downlink communications 212, and mobility management. eNodeBs in EPS/LTE networks do not utilize a separate controller (i.e., an RNC) to communicate with the EPC network (not shown); in other embodiments utilizing other specification protocols, RANs can include an RNC to enable communication between BSs and core networks.

In accordance with embodiments, UEs 102 and 104 can be configured to communicate Orthogonal Frequency-Division Multiplexing (OFDM) communication signals with any of the eNodeBs 202 and 204 over a multicarrier communication channel in accordance with an Orthogonal Frequency-Division Multiple Access (OFDMA) communication technique for downlink communications 212, and a Single Carrier Frequency Division Multiple Access (SC-FDMA) communication technique for uplink communications 210. The OFDM signals can comprise a plurality of orthogonal subcarriers.

In accordance with some embodiments, the UEs 102 and 104 can be configured to determine a synchronization reference time based on reception of one or more signals from any of the eNodeBs 202 and 204. A UE can also be configured to support device-to-device (D2D) communication with other UEs using OFDMA, SC-FDMA or other multiple access schemes.

In some embodiments, a downlink resource grid can be used for transmissions on the downlink communications 212 from any of the eNodeBs 202 and 204 to the UEs 102 and 104 while transmissions for the uplink communications 210 from the UEs 102 and 104 to any of the eNodeBs 202 and 204 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quanta of resources that currently can be allocated. There are several different physical downlink channels that are conveyed using such resource blocks.

The physical downlink shared channel (PDSCH) carries user data and higher-layer signaling to the UEs 102 and 104. The physical downlink control channel (PDCCH) carries information about the transport format and resource allocations related to the PDSCH channel, among other things. It also informs the UEs 102 and 104 about the transport format, resource allocation, and H-ARQ information related to the uplink shared channel. Typically, downlink scheduling (assigning control and shared channel resource blocks to UEs 102 within a cell) is performed at any of the eNodeBs 202 and 204 based on channel quality information fed back from the UEs 102 and 104 to any of the eNodeBs 202 and 204, and then the downlink resource assignment information is sent to a UE on the control channel (i.e., the PDCCH) used for (i.e., assigned to) said UE.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four quadrature phase shift keying (QPSK) symbols are mapped to each REG. The PDCCH can be transmitted using one or more CCEs, depending on the size of DCI and the channel condition. There can be four or more different PDCCH formats defined in LTE with different numbers of CCEs (e.g., aggregation level, L=1, 2, 4, or 8).

D2D communication link 214 allows UEs 102 and 104 to communicate directly with each other without using RAN 106. Device discovery signal resources allocation and high-layer signaling procedures can be initially communicated to the UEs 102 and 104 from any of the eNodeBs 202 and 204 to enable D2D communication in an efficient way. D2D services may alternatively be referred to herein as proximity-based services (ProSe). These features are developed for both public safety (PS) and non-PS (e.g., commercial) services. For PS services, D2D communication can be used in emergency situations when E-UTRAN coverage is not available, as D2D communication allows mobile computing devices to communicate with each other directly without the use of (at least some) cellular infrastructure. Non-PS services allow for network traffic offloading—e.g., when users within a given proximity are utilizing services that consume significant bandwidth, such as video sharing, D2D services eliminate the user of E-UTRAN resources. A D2D communication can comprise a proximity based device discovery, a D2D communication between devices, or a combination of both communications (i.e., a proximity based device discovery followed by a subsequent D2D communication.

The example described below is for the UEs 102 and 104 establishing a connection via LTE signals. It is possible, in some embodiments, for UEs 102 and 104 to establish a connection via other formats of communication (e.g., Bluetooth, near field communication (NFC), etc.).

D2D-enabled UEs 102 and 104 can perform discovery for detecting neighboring D2D-enabled devices, and are allocated resources from any of the eNodeBs 202 and 204 in order to perform device discovery operations. These allocated resources can include a discovery region or discovery zone comprising resources (e.g., resource blocks (RBs) or physical resource blocks (PRBs)) for transmitting discovery signals, described in further detail below.

Figure 3:
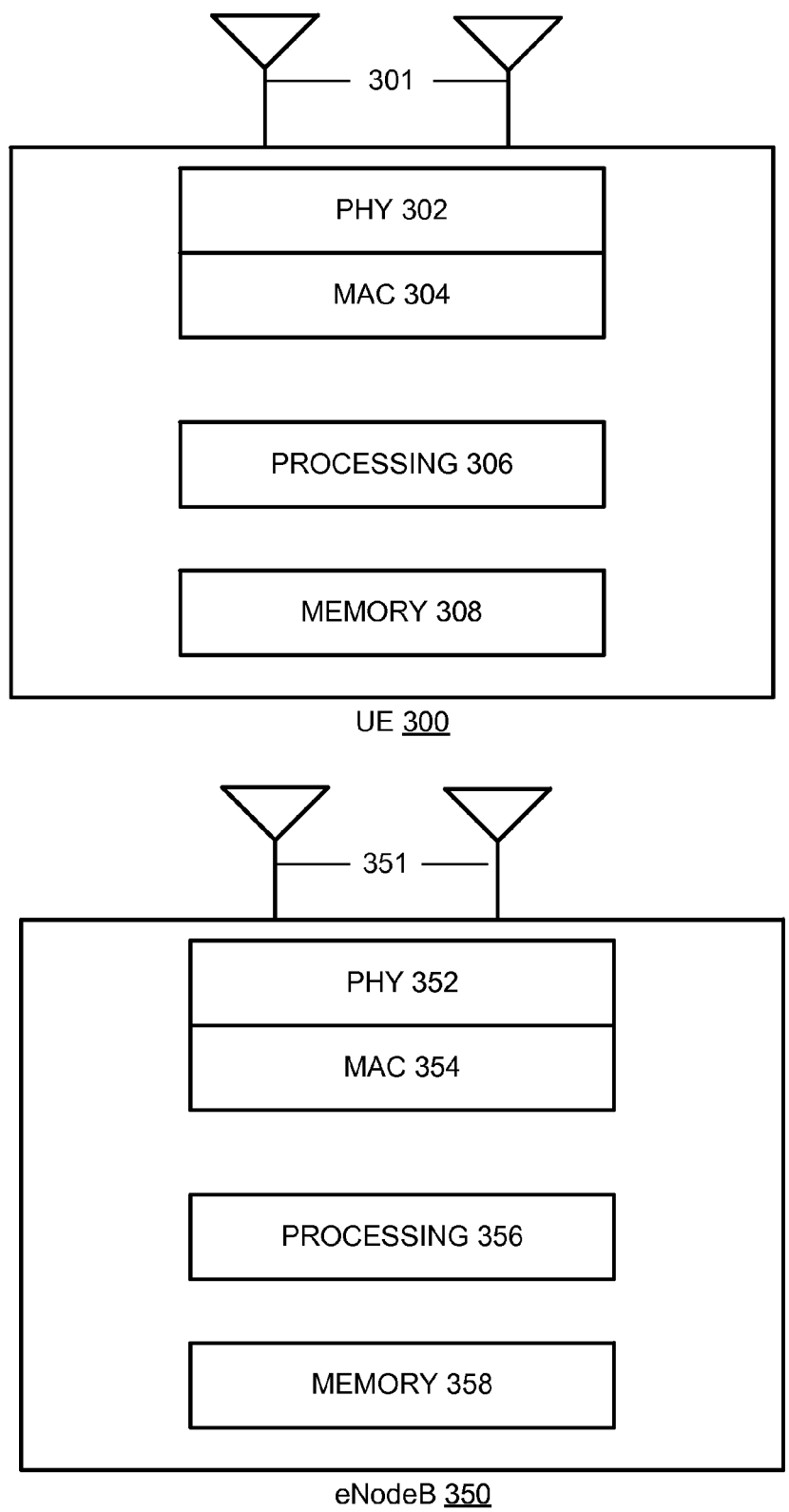
FIG. 3 shows a block diagram of a user equipment (UE) and an enhanced NodeB (eNodeB) in accordance with some embodiments.

FIG. 3 shows a block diagram of a UE 300 and an eNodeB 350 in accordance with some embodiments. It should be noted that in some embodiments, the eNodeB 350 can be a stationary non-mobile device. The UE 300 can include physical layer circuitry 302 for transmitting and receiving signals to and from the eNodeB 350, other eNodeBs, other UEs, or other devices using one or more antennas 301, while the eNodeB 350 can include physical layer circuitry 352 for transmitting and receiving signals to and from the UE 300, other eNodeBs, other UEs, or other devices using one or more antennas 351. The UE 300 can also include medium access control layer (MAC) circuitry 304 for controlling access to the wireless medium, while the eNodeB 350 can also include MAC circuitry 354 for controlling access to the wireless medium. The UE 300 can also include processing circuitry 306 and memory 308 arranged to perform the operations described herein, and the eNodeB 350 can also include processing circuitry 356 and memory 358 arranged to perform the operations described herein.

The antennas 301, 351 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351 can be effectively separated to benefit from spatial diversity and the different channel characteristics that can result.

Although the UE 300 and eNodeB 350 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs) and combinations of various hardware and circuitry for performing at least the functions described herein. In some embodiments, the functional elements can refer to one or more processes operating on one or more processing elements.

Embodiments can be implemented in one or a combination of hardware, firmware and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device.

Figure 4A:
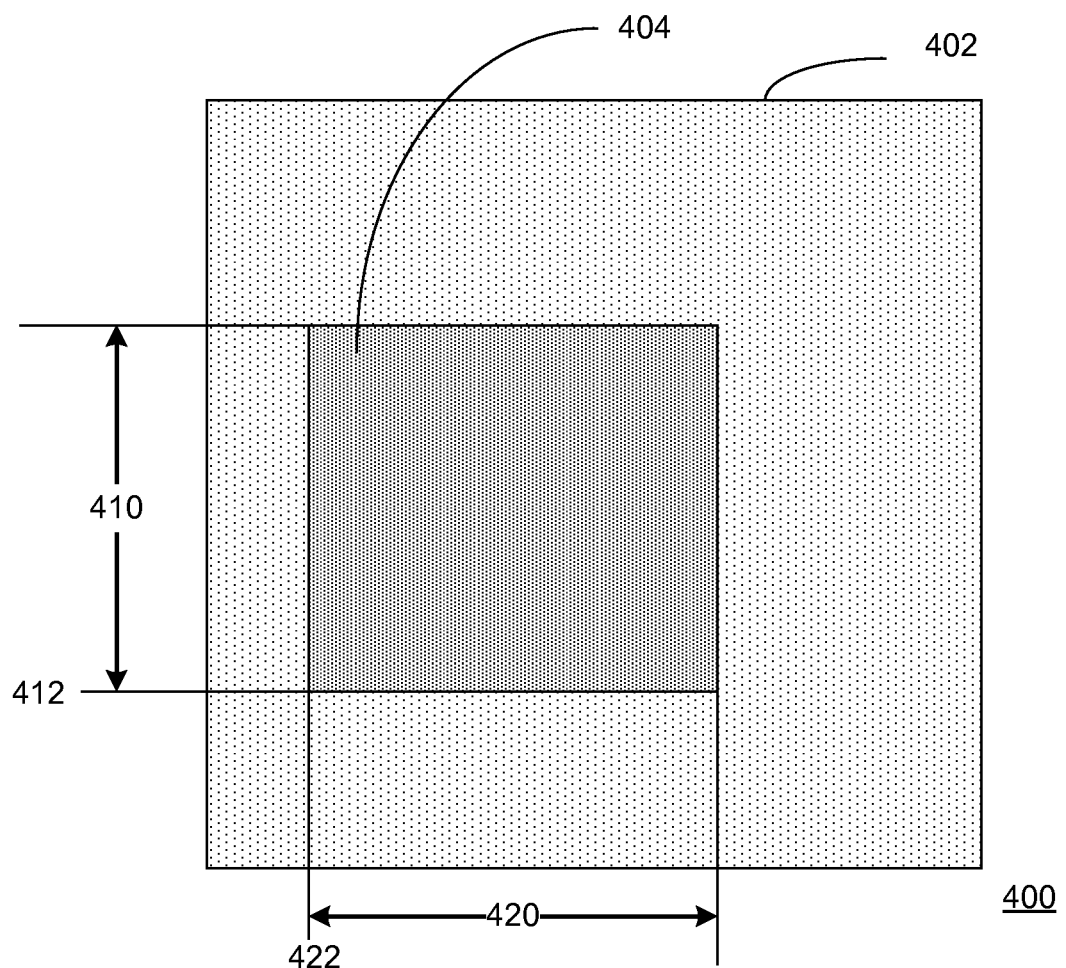
FIG. 4A and FIG. 4B are illustrations of resource blocks (RBs) allocated for device-to-device (D2D) services according to embodiments of the disclosure.

FIG. 4A is an illustration of RBs allocated for D2D services according to an embodiment of the disclosure. In this embodiment, a graph 400 illustrates a mapping plot where the x-axis is frames in the frequency domain (e.g., OFDM symbols) and the y-axis is subcarriers. In the graph 400, a region 402 comprises an LTE operations zone, and a region comprises a discovery zone 404 for D2D devices. As discussed above, an eNodeB can periodically allocate discovery resources in the form of D2D discovery zones/regions for UEs to transmit discovery information, which may comprise discovery packets with payload information or discovery packets preceded by a discovery preamble. The number of physical resource blocks used for discovery packet transmissions can comprise one or more RBs, depending on the payload size and the overall discovery performance goals. Discovery resource pool or discovery zone 404 includes a number of allocated RBs (shown as dimension 410 with starting resource block index 412) allocated per a number of subframes (shown as dimension 420 with starting subframe index 422).

In some embodiments, UEs may perform D2D direct discovery using a pre-existing uplink channel resources, and the physical discovery channel can be designed based on the currently defined physical uplink shared channel (PUSCH) structure including the demodulation reference signal (DMRS). Message sizes for PS and non-PS D2D discovery services can be different. A DMRS sequence can be used to carry one or more information bits to indicate a specific message size.

Figure 4B:
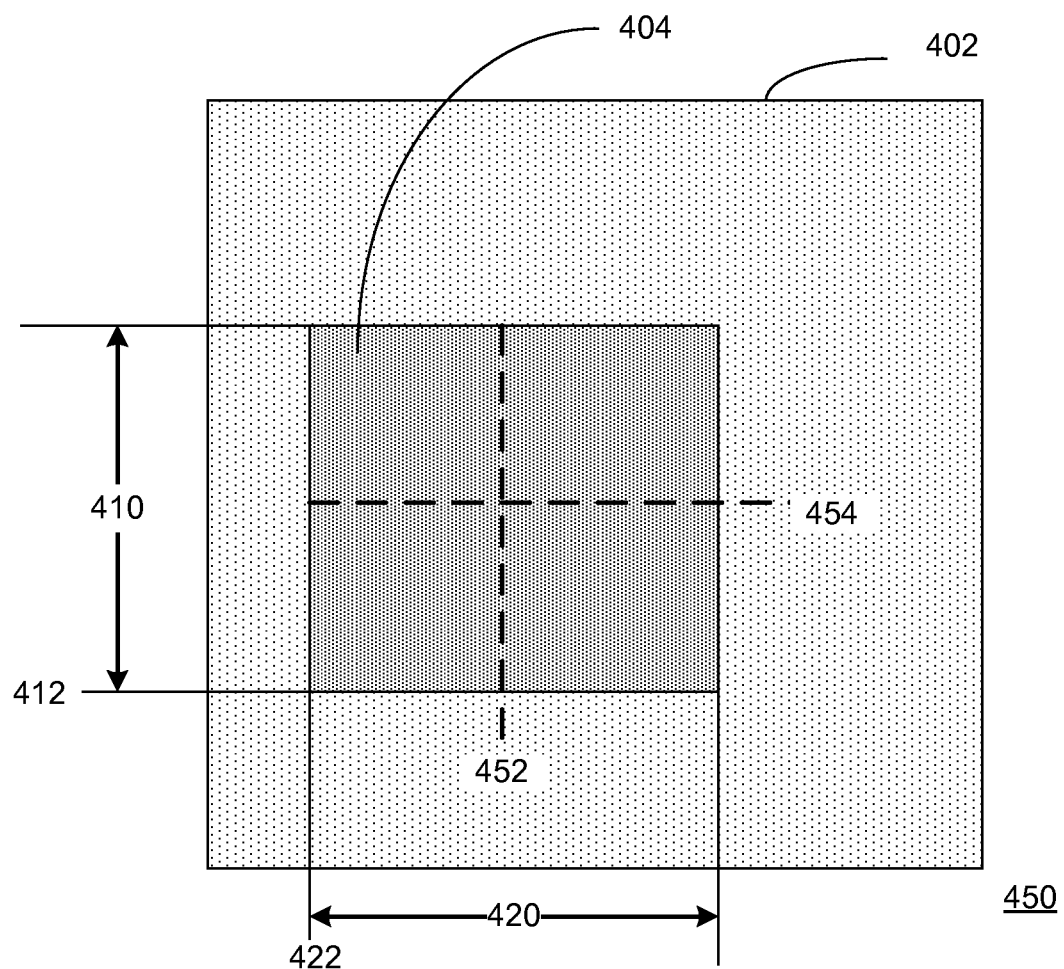

FIG. 4B is an illustration of RBs allocated for D2D services according to an embodiment of the disclosure. In this embodiment, graph 450 illustrates to partitioning discovery zone 404 for transmission of PS and non-PS discovery signals. In other words, separate time-frequency resources for PS and non-PS discovery signals can be configured by an eNodeB, so that D2D UEs can transmit and receive PS and non-PS discovery signals on the corresponding resource pools. Discovery zone 404 may be partitioned by subframes, such that subframes to the left of line 452 may be allocated for a PS D2D service, and subframes to the right of line 452 may be allocated for a non-PS D2D service. Discovery zone 404 may be partitioned across physical resource blocks (PRBs), such that PRBs above 454 may be allocated for a PS D2D service, and PRBs below line 454 may be allocated for a non-PS D2D service. Of course, in other embodiments, any other partitioning scheme may be used.

In some embodiments, the configuration of the two resource pools for PS and non-PS discovery resource pools may be signaled only for reception. For transmission, the resources can be configured in a UE-specific manner, such as Type 2A discovery resource allocation (i.e., allocation for each specific discovery message transmission occasion) or Type 2B discovery resource allocation (i.e., semi-persistent allocation). In some embodiments, resources can be configured using a combination of UE-specific and non-UE-specific manners—e.g., Type 2A/Type 2B and Type 1 discovery resource allocation (wherein Type 1 discovery resource allocation refers to the eNodeB allocating a periodically occurring set of discovery resources in a non-UE-specific manner).

Figure 5:
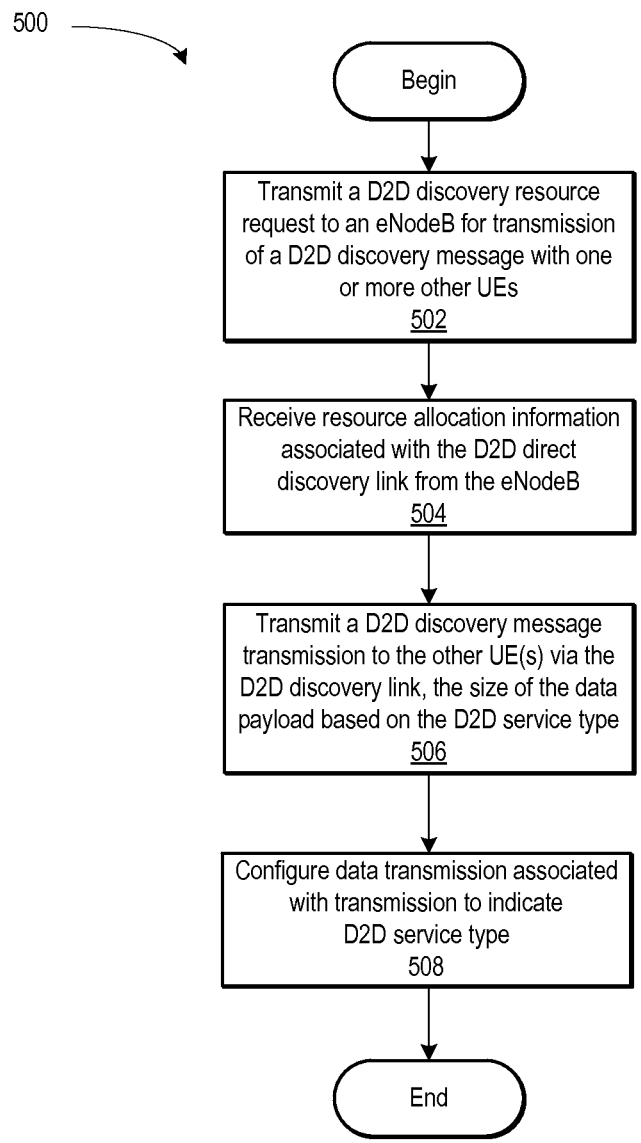
FIG. 5 illustrates a flow diagram for allocating RBs for D2D services according to embodiments of the disclosure.

FIG. 5 illustrates a flow diagram for allocating RBs for D2D services according to an embodiment of the disclosure. Logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are executed in every implementation. Other process flows are possible.

Process 500 includes an operation, executed by a UE, to transmit a D2D discovery resource request to an eNodeB (e.g., as per Type 2 or UE-specific discovery resource allocation procedure) for transmission of a D2D discovery message with a one or a plurality of other UEs (block 502). As discussed above, the D2D discovery request is associated with a D2D service type—e.g., a PS service or a non-PS service. This operation may not be relevant for UE-autonomous resource selection procedure (e.g., Type 1 discovery).

The UE then executes an operation to receive resource allocation information associated with the D2D direct discovery link from the eNodeB (block 504). Depending on the resource allocation procedure, for Type 1 discovery, this information can be UE-specific and can be transmitted using common RRC signaling, e.g., via System Information Block (SIB) signaling, whereas for Type 2A or 2B discovery, this information would be UE-specific and indicated via combination of common RRC (e.g., SIB) and dedicated RRC signaling. In some embodiments, as described above, the eNodeB allocates RBs specific for a D2D service type (e.g., RBs specifically allocated for a PS service and RBs specifically allocated for a non-PS service, as illustrated in FIG. 4B); in other embodiments, data associated with a D2D discovery message transmission is configured by circuitry of the transmitting UE to indicate a D2D service type to the one or plurality of other UEs.

In this embodiment, the UE executes an operation to transmit a D2D discovery message to the one or the plurality of other UEs via the D2D direct discovery link, where the message includes at least one data frame comprising a data payload (block 506). The size of the data payload is determined based on the D2D service type. For example, a data payload size for the PS service can comprise a larger size than a data payload size of the non-PS service.

The UE executes an operation to configure data transmission associated with the at least one data frame of the D2D data transmission to indicate the D2D service type, that may include the data payload size (block 508). In some embodiments, for example, the MAC of the UE is to configure the data associated with the at least one data frame of the D2D data transmission to indicate the data payload size, and is to further assert one or more bits in a MAC header of the at least one data frame. In other embodiments, the PHY of the UE is to configure the data associated with the at least one data frame of the D2D data transmission to indicate the data payload size, and is to further select a cyclic redundancy check (CRC) code associated with the D2D service type for the data payload. In some of these embodiments, described in further detail below, the CRC code associated with the D2D service type for the data payload comprises a CRC masked with a data mask value associated with the D2D service type. In some other embodiments, for example for Type 1 discovery wherein the UE autonomously selects resources from within a discovery resource pool, the MAC and PHY of the UE is to configure the data transmission procedure such that the UE transmits on discovery resources (i.e., the RBs) from within the discovery resource pool or discovery zone configured by the eNB for the particular discovery service type.

In embodiments where there happens to be only one type of discovery signal transmission (e.g., PS or non-PS), then only the corresponding discovery resource pool can be configured. Alternatively, the parameter which indicates whether a discovery resource pool or discovery zone is allocated for PS service or non-PS service if both are deployed in the network can be configured as part of the discovery resource pool configuration signaled by the eNB. In this regard, ProSe-enabled devices can differentiate the payload size according to this parameter.

The above configuration of resource pools for transmission and reception or for reception can be signaled via signal information block (SIB) signaling by the eNodeB for D2D UEs within network coverage. For partial network coverage scenarios, such information on the configuration can be forwarded by one or a plurality of UEs that are within network coverage to the UEs that are outside network coverage. For out of network coverage scenarios, this configuration can be predefined or broadcasted by the centralized D2D device or be associated with and signaled by the independent synchronization source, with the configuration further forwarded by other dependent/gateway synchronization sources.

Figure 6A:
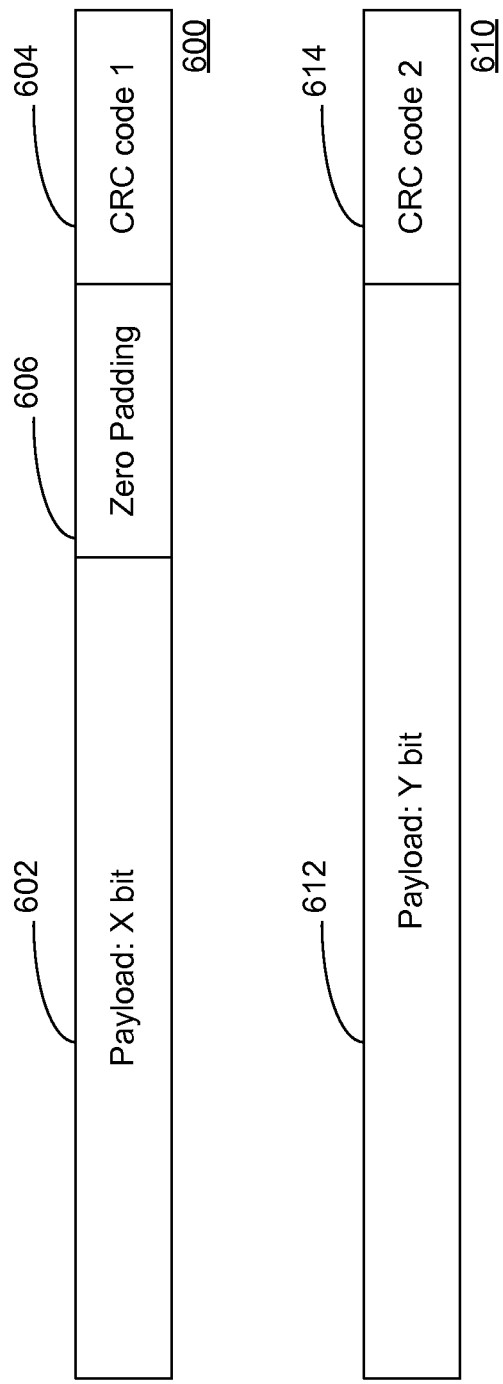
FIG. 6A and FIG. 6B are illustrations of data frames for D2D data transmissions according to embodiments of the disclosure.

FIG. 6A is an illustration of data frames for D2D discovery message transmissions according to an embodiment of the disclosure. In this embodiment, a data frame 600 is used for a non-PS discovery service, and a data frame 610 is used for a PS discovery service. Data frame 600 includes payload 602 and cyclic redundancy check (CRC) code 604. Data frame 610 includes payload 612 and CRC code 614. As shown in this illustration, the PS discovery service is assumed to use a larger discovery message payload compared to the non-PS service, although the embodiments in this invention can be straightforwardly adapted to handle the opposite case (i.e., discovery message payload size for non-PS discovery is larger than PS discovery).

In this embodiment, data frame 600 further includes zero padding 606 so as to ensure that the "overall" payload sizes of different types of discovery services are same. In this regard, ProSe enabled UEs may only need to decode the information bits once. In order to differentiate the sizes of data payloads 602 and 612, embodiments can utilize different CRC codes in order to indicate the different payload sizes (i.e., the CRC code 1 604 is associated with a non-PS service, and the CRC code 2 614 is associated with a PS service). Thus, ProSe-enabled devices can only perform decoding processes (e.g., turbo decoding) once, and subsequently can perform multiple CRC decoding attempts to differentiate the payload sizes or discovery services.

In other embodiments not utilizing zero padding, ProSe-enabled UEs can performance blind decoding for different types of discovery services with different payload sizes and CRC codes. Upon successful decoding of CRC bits, ProSe-enabled UEs can determine the corresponding payload sizes or types of discovery services; however, the difference in "overall" payload sizes may increase the complexity of the decoding process. In other words, embodiments may utilize the zero padding 606 to reduce the decoding complexity.

Figure 6B:
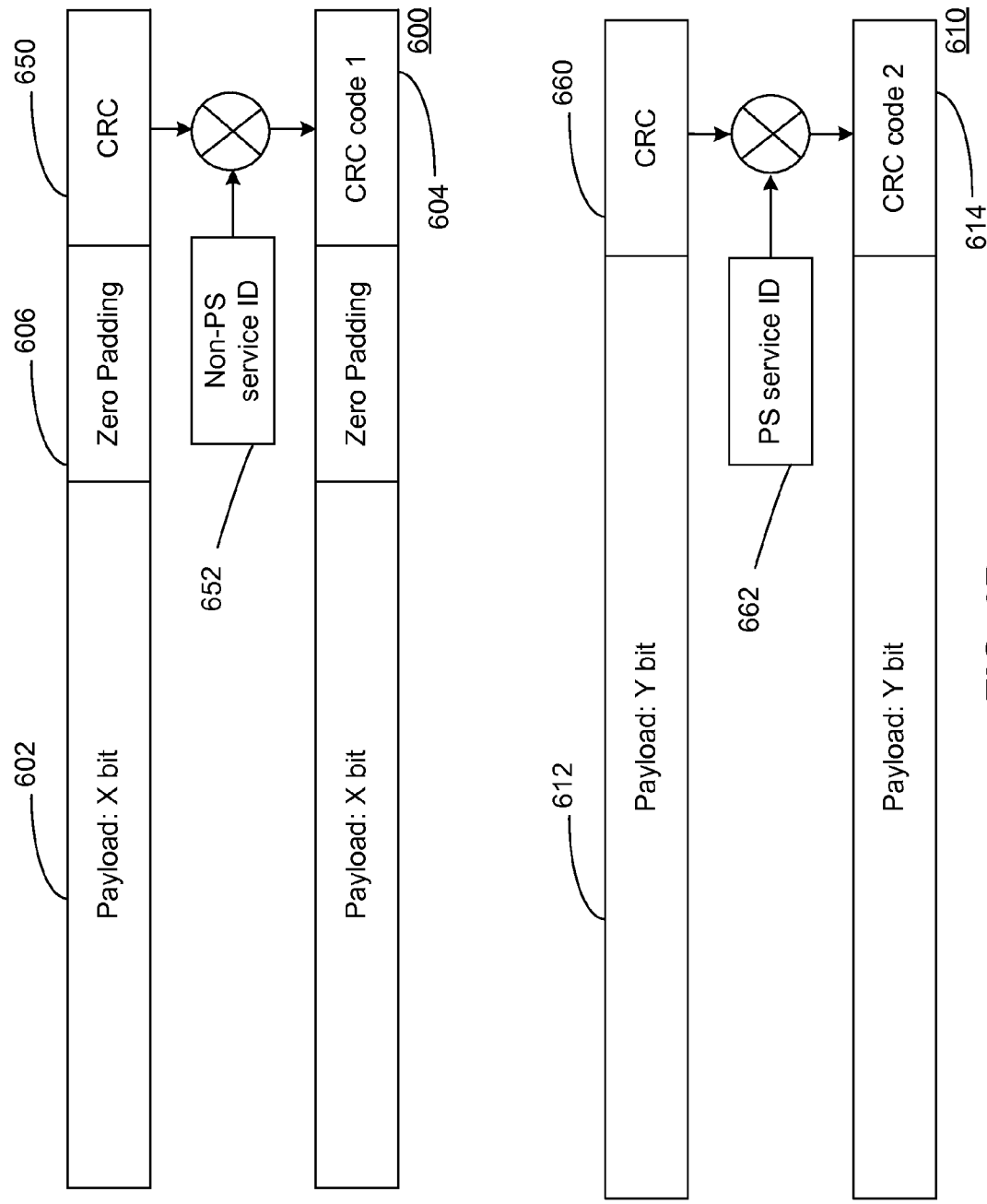

FIG. 6B illustrates a procedure to generate different CRC codes for different D2D service data payloads according to an embodiment of the disclosure. After the generation of CRC 650, an XOR operation is employed for the generated CRC bits using the service ID 652, which is used for a non-PS service. The masked CRC bits are then appended at the end of data frame 600 as CRC code 1 604. Similar operations are executed for data frame 610; after the generation of CRC 660, an XOR operation is employed for the generated CRC bits using the service ID 662, which is used for PS services. The masked CRC bits are then appended at the end of the data frame 610 as CRC code 2 514.

In another embodiment of the disclosure, different payload sizes or discovery services can be differentiated based on different scrambling codes. In particular, the scrambling identity can be a function of discovery service identity. In some embodiments, the identity of a discovery service can be incorporated with other parameters and/or a combination of other parameters, e.g., common scrambling ID, discovery resource index, etc., for scrambling identity generation.

Figure 7:
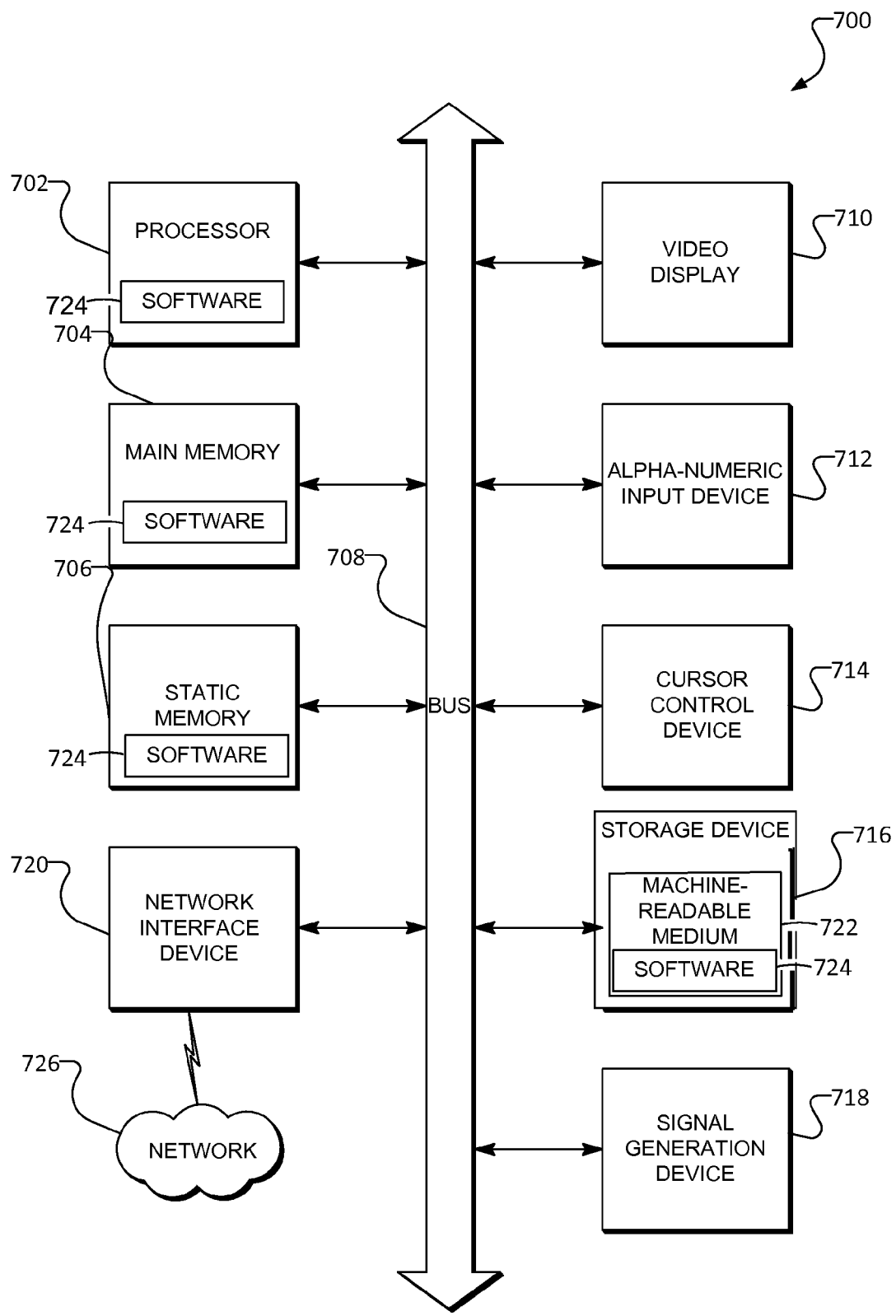
FIG. 7 is a block diagram illustrating components of a machine, according to some example embodiments, able to read instructions from a machine-readable medium and perform any one or more of the methodologies discussed herein, according to aspects of the disclosure.

FIG. 7 is a block diagram illustrating components of a machine, according to some example embodiments, able to read instructions from a machine-readable medium and perform any one or more of the methodologies discussed herein, according to aspects of the disclosure. In particular, FIG. 7 illustrates an exemplary computer system 700 within which software 724 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 700 can function as any of the above described UEs or eNodeBs, and can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 can further include a video display unit 710 (e.g., a liquid crystal display (LCD) or a cathode ray tube (CRT)). The computer system 700 also includes an alphanumeric input device 712 (e.g., a keyboard), a UI navigation (or cursor control) device 714 (e.g., a mouse), a storage device 716, a signal generation device 718 (e.g., a speaker) and a network interface device 720.

The storage device 716 includes a non-transitory machine-readable medium 722 on which is stored one or more sets of data structures and software 724 embodying or utilized by any one or more of the methodologies or functions described herein. The software 724 can also reside, completely or at least partially, within the main memory 704 and/or within the processor 702 during execution thereof by the computer system 700, the main memory 704 and the processor 702 also constituting non-transitory, machine-readable media 722. The software 724 can also reside, completely or at least partially, within the static memory 706.

While the non-transitory machine-readable medium 722 is shown in an example embodiment to be a single medium, the term "machine-readable medium" can include a single medium or multiple media (e.g., a centralized or distributed database, and/or associated caches and servers) that store the one or more software 724 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media 722 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 724 can further be transmitted or received over a communications network 726 using a transmission medium. The software 724 can be transmitted using the network interface device 720 and any one of a number of well-known transfer protocols (e.g., hypertext transfer protocol (HTTP)). Examples of communication networks include a local area network (LAN), a wide area network (WAN), the internet, mobile telephone networks, plain old telephone service (POTS) networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software 724.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Some embodiments describe a user equipment (UE) comprising circuitry configured to transmit a device-to-device (D2D) discovery request to an eNodeB to establish a D2D direct discovery link with a second UE, the D2D discovery request associated with a D2D service type;, receive resource allocation information associated with the D2D direct discovery link to transmit a discovery message to at least the second UE from the eNodeB, wherein the information is received via common or dedicated Radio Resource Control (RRC) signaling, transmit a D2D data transmission to the second UE via the D2D direct discovery link, including at least one data frame comprising a data payload, a size of the data payload determined based on the D2D service type, and configure data associated with the at least one data frame of the D2D data transmission to indicate the data payload size.

In some embodiments, the D2D service type is to comprise at least one of a public safety (PS) service or a non-PS service. In some embodiments, a data payload size for the PS service is to comprise a larger size than a data payload size of the non-PS service.

In some embodiments, the circuitry is to further comprise a medium access control layer (MAC), wherein the MAC is to configure the data associated with the at least one data frame of the D2D discovery message transmission to indicate the data payload size, and is to further assert one or more bits in a MAC header of the at least one data frame. In some embodiments, the circuitry is to further comprise a physical layer (PHY), wherein the PHY is to configure the data associated with the at least one data frame of the D2D discovery message transmission to indicate the data payload size, and is to further select a cyclic redundancy check (CRC) code associated with the D2D service type for the data payload. In some embodiments, the CRC code associated with the D2D service type for a data payload mask comprises a CRC masked with a data mask value associated with the D2D service type.

In some embodiments, the circuitry is to further comprise a physical layer (PHY), wherein the PHY is to configure the data associated with the at least one data frame of the D2D discovery message transmission to indicate the data payload size, and is to further request a resource block allocated by the eNodeB exclusively for use with the D2D service type.

In some embodiments, the circuitry is to further comprise a medium access control layer (MAC), wherein the MAC is to configure the data associated with the at least one data frame of the D2D data transmission to indicate the data payload size, and is to further append the data payload with one or more zeros to match a bit count of a data payload size associated with a second D2D service type.

In some embodiments, the circuitry is further configured to transmit the D2D discovery request to the eNodeB via a physical uplink shared channel (PUSCH). In some embodiments, the circuitry further comprises one or more antennas to transmit the D2D discovery request and the D2D data transmission.

Some embodiments describe an eNodeB comprising circuitry configured to allocate a set of physical resource blocks (PRBs) for a plurality of device-to-device (D2D) discovery service types, including a first subset of PRBs and subframes for a first D2D discovery service type, and a second subset of PRBs and subframes for a second D2D discovery service type, the first subset of PRBs and subframes and the second subset of PRBs and subframes to comprise non-overlapping subsets, and configure transmission information comprising PRB allocation information for transmission to one or more user equipments (UEs) for transmission via at least one of common Radio Resource Control (RRC) or dedicated RRC signaling.

In some embodiments, the first D2D discovery service type comprises a public safety (PS) service, and the second D2D discovery service type comprises a non-PS service. In some embodiments, the circuitry is further configured to allocate one or more demodulation reference signals (DMRS) for each of the plurality of D2D discovery service types.

Some embodiments describe a method comprising transmitting a device-to-device (D2D) discovery request to an eNodeB for establishing a D2D direct discovery link with a user equipment (UE), the D2D discovery request associated with a D2D discovery service type comprising at least one of a public safety (PS) service or a non-PS service, receiving resource allocation information associated with the D2D communication link from the eNodeB, wherein the resource allocation information comprises UE-specific or UE-common information, and generating a D2D discovery message for transmission to the UE via the D2D communication link, the D2D discovery message including at least one data frame comprising a data payload, a size of the data payload determined based on the D2D service type, and data associated with the at least one data frame of the D2D discovery message configured to indicate the data payload size.

In some embodiments configuring data associated with the at least one data frame of the D2D discovery message transmission to indicate the data payload size includes asserting one or more bits in a MAC header of the data frame. In some embodiments, configuring data associated with the at least one data frame of the D2D discovery message transmission to indicate the data payload size includes selecting a cyclic redundancy check (CRC) code associated with the D2D discovery service type for the data payload. In some embodiments, configuring data associated with the at least one data frame of the D2D discovery message transmission to indicate the data payload size includes masking a cyclic redundancy check (CRC) code for the data payload with a data mask value associated with the D2D service type.

Some embodiments describe a non-transitory computer-readable storage medium whose contents, when executed by a computing system, cause the computing system to perform operations, comprising transmitting a device-to-device (D2D) discovery request to an eNodeB for establishing a D2D direct discovery link with a user equipment (UE), the D2D discovery request associated with a D2D discovery service type comprising at least one of a public safety (PS) service or a non-PS service, receiving resource allocation information associated with the D2D communication link from the eNodeB, wherein the resource allocation information comprises UE-specific or UE-common information, transmitting a D2D discovery message transmission to the UE via the D2D communication link, including at least one data frame comprising a data payload, a size of the data payload determined based on the D2D service type, and configuring data associated with the at least one data frame of the D2D discovery message transmission to indicate the data payload size.

In some embodiments, the operations further comprise requesting a discovery resource allocated by the eNodeB exclusively for use with the D2D discovery service type during a UE-specific discovery resource allocation procedure. In some embodiments, configuring data associated with the at least one data frame of the D2D discovery message transmission to indicate the data payload size includes appending the data payload with one or more zeros to match a bit count of a data payload size associated with a second D2D service type. In some embodiments, the D2D discovery request is transmitted to the eNodeB via a physical uplink shared channel (PUSCH). In some embodiments, configuring data associated with the at least one data frame of the D2D discovery message transmission to indicate the data payload size includes asserting one or more bits in a MAC header of the data frame. In some embodiments, configuring data associated with the at least one data frame of the D2D discovery message transmission to indicate the data payload size includes at least one of selecting a cyclic redundancy check (CRC) code associated with the D2D discovery service type for the data payload, or masking a CRC code for the data payload with a data mask value associated with the D2D service type.

What is claimed is:

1. A user equipment (UE) comprising:
   transmit circuitry to transmit a device-to-device (D2D) discovery request to an evolved Node B (eNodeB) to establish a D2D direct discovery link with a second UE, the D2D discovery request associated with a D2D service type;
   receive circuitry to receive resource allocation information associated with the D2D direct discovery link to transmit a discovery message to at least the second UE from the eNodeB, wherein the information is received via common or dedicated Radio Resource Control (RRC) signaling;
   the transmit circuitry further to transmit a D2D data transmission to the second UE via the D2D direct discovery link, including at least one data frame comprising a data payload, a size of the data payload determined based on the D2D service type;
   processing circuitry to:
   configure data associated with the at least one data frame of the D2D data transmission to indicate the data payload size,
   select among a physical layer (PHY) and a medium access control layer (MAC) to configure the data associated with the at least one data frame of the D2D discovery message transmission to indicate the data payload size, wherein when the PHY is selected, the PHY is to:
   select a cyclic redundancy check (CRC) code associated with the D2D service type for the data payload, wherein the CRC code associated with the D2D service type for a data payload mask comprises a CRC masked with a data mask value associated with the D2D service type.

2. The UE of claim 1, wherein the D2D service type is to comprise at least one of a public safety (PS) service or a non-PS service.

3. The UE of claim 2, wherein a data payload size for the PS service is to comprise a larger size than a data payload size of the non-PS service.

4. The UE of claim 1, wherein the MAC is selected, the MAC is to further assert one or more bits in a MAC header of the at least one data frame.

5. The UE of claim 1, wherein the PHY is selected and is to further request a resource block allocated by the eNodeB exclusively for use with the D2D service type.

6. The UE of claim 1, wherein the MAC selected and is to configure the data associated with the at least one data frame of the D2D discovery message transmission to further indicate payload size associated with a second D2D service type.

7. The UE of claim 1, wherein the transmit circuitry is further configured to transmit the D2D discovery request to the eNodeB via a physical uplink shared channel (PUSCH).

8. The UE of claim 1, further comprising one or more antennas to transmit the D2D discovery request and the D2D data transmission.

9. A method comprising:
   transmitting a device-to-device (D2D) discovery request to an evolved Node B (eNodeB) for establishing a D2D direct discovery link with a user equipment (UE), the D2D discovery request associated with a D2D discovery service type comprising at least one of a public safety (PS) service or a non-PS service;
   receiving resource allocation information associated with the D2D direct discovery link from the eNodeB, wherein the resource allocation information comprises UE-specific or UE-common information;
   generating a D2D discovery message for transmission to the UE via the D2D direct discovery link, the D2D discovery message including:
   at least one data frame comprising a data payload, a size of the data payload determined based on the D2D service type, and
   data associated with the at least one data frame of the D2D discovery message configured to indicate the data payload size, and
   select among a physical layer (PHY) and a medium access control layer (MAC) to configure the data associated with the at least one data frame of the D2D discovery message transmission to indicate the data payload size, wherein when the PHY is selected, the PHY is to:
   select a cyclic redundancy check (CRC) code associated with the D2D service type for the data payload, wherein the CRC code associated with the D2D service type for a data payload mask comprises a CRC masked with a data mask value associated with the D2D service type.

10. The method of claim 9, wherein configuring data associated with the at least one data frame of the D2D discovery message transmission to indicate the data payload size includes asserting one or more bits in a MAC header of the data frame.

11. A non-transitory computer-readable storage medium whose contents, when executed by a computing system, cause the computing system to perform operations, comprising:

transmitting a device-to-device (D2D) discovery request to an evolved Node B (eNodeB) for establishing a D2D direct discovery link with a user equipment (UE), the D2D discovery request associated with a D2D discovery service type comprising at least one of a public safety (PS) service or a non-PS service;

receiving resource allocation information associated with the D2D communication link from the eNodeB, wherein the resource allocation information comprises UE-specific or UE-common information;

transmitting a D2D discovery message transmission to the UE via the D2D communication link, including at least one data frame comprising a data payload, a size of the data payload determined based on the D2D service type; and configuring data associated with the at least one frame of the D2D discovery message transmission to indicate the data payload size; and selecting among a physical layer (PHY) and a medium access control layer (MAC) to configure the data associated with the at least one data frame of the D2D discovery message transmission to indicate the data payload size, wherein when the PHY is selected, the PHY is to:

select a cyclic redundancy check (CRC) code associated with the D2D service type for the data payload, wherein the CRC code associated with the D2D service type for a data payload mask comprises a CRC masked with a data mask value associated with the D2D service type.

12. The non-transitory computer-readable storage medium of claim 11, further comprising:

requesting a discovery resource allocated by the eNodeB exclusively for use with the D2D discovery service type during a UE-specific discovery resource allocation procedure.

13. The non-transitory computer-readable storage medium of claim 11, wherein configuring data associated with the at least one data frame of the D2D discovery message transmission to indicate the data payload size includes appending the data payload with one or more zeros to match a bit count of a data payload size associated with a second D2D service type.

14. The non-transitory computer-readable storage medium of claim 11, wherein the D2D discovery request is transmitted to the eNodeB via a physical uplink shared channel (PUSCH).

15. The non-transitory computer-readable storage medium of claim 11, wherein configuring data associated with the at least one data frame of the D2D discovery message transmission to indicate the data payload size includes asserting one or more bits in a MAC header of the data frame.

\* \* \* \* \*